US011969742B2

(12) United States Patent
Hayden et al.

(10) Patent No.: US 11,969,742 B2
(45) Date of Patent: Apr. 30, 2024

(54) HEATED HOSE NOZZLE

(71) Applicant: Rheem Manufacturing Company, Atlanta, GA (US)

(72) Inventors: Christopher M. Hayden, Waterbury, CT (US); Sergiu G. Mihu, Waterbury, CT (US); Eric R. Jurczyszak, Waterbury, CT (US); Curtis J. Keohane, Waterbury, CT (US)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

(21) Appl. No.: 17/588,492

(22) Filed: Jan. 31, 2022

(65) Prior Publication Data

US 2022/0226839 A1 Jul. 21, 2022

Related U.S. Application Data

(63) Continuation-in-part of application No. 15/968,212, filed on May 1, 2018, now Pat. No. 11,235,341.

(51) Int. Cl.

*B05B 1/24* (2006.01)
*B05B 9/00* (2006.01)
(Continued)

(52) U.S. Cl.

CPC ................ *B05B 1/24* (2013.01); *B05B 9/002* (2013.01); *B05B 9/01* (2013.01); *B05B 12/002* (2013.01);
(Continued)

(58) Field of Classification Search

CPC ....... B05B 7/12; B05B 7/1613; B05B 7/1693; B05B 7/002; B05B 7/10; B05B 1/14;
(Continued)

(56) References Cited

U.S. PATENT DOCUMENTS 2,976,392 A 3/1961 Wabnitz
4,495,481 A * 1/1985 Hickling ................ H01H 37/10 337/349
4,618,100 A 10/1986 White et al.
4,751,501 A 6/1988 Gut
5,028,017 A 7/1991 Simmons et al.
(Continued)

FOREIGN PATENT DOCUMENTS

CA 2920928 C 9/2005

*Primary Examiner* — Christopher R Dandridge

(74) *Attorney, Agent, or Firm* — Eversheds Sutherland (US) LLP

(57) ABSTRACT

The disclosed technology includes a hose nozzle assembly with apertures sized to facilitate heating groundwater based on the expected temperature of the groundwater. The hose nozzle assembly can have a handheld enclosure having a handle portion connected to a body portion, a heating chamber having a heating element configured to heat a fluid, and a spray nozzle. The spray nozzle can include a first aperture configured to provide a first spray pattern at a first flow rate corresponding to a first change in temperature of fluid flowing through the heating chamber and a second aperture configured to provide a second spray pattern at a second flow rate corresponding to a second change in temperature of fluid flowing through the heating chamber. The second flow rate can be less than the first flow rate and the second change in temperature can be greater than the first change in temperature.

20 Claims, 9 Drawing Sheets

(51) Int. Cl.

| | |
|---|---|
| ***B05B 9/01*** | (2006.01) |
| ***B05B 12/00*** | (2018.01) |
| ***B05B 12/10*** | (2006.01) |
| ***F24H 1/10*** | (2022.01) |
| ***F24H 9/1818*** | (2022.01) |
| ***F24H 9/20*** | (2022.01) |
| ***H05B 3/16*** | (2006.01) |

(52) U.S. Cl.
CPC ............. *B05B 12/10* (2013.01); *F24H 1/103* (2013.01); *F24H 9/1818* (2013.01); *F24H 9/2028* (2013.01); *H05B 3/16* (2013.01); *F24D 2220/042* (2013.01)

(58) Field of Classification Search
CPC ......... B05B 1/1645; B05B 1/24; B05B 9/002; B05B 9/01; B05B 12/002; B05B 12/10; H05B 3/16; F24H 9/2028; F24H 9/1818; F24H 1/103
See application file for complete search history.

(56) References Cited

U.S. PATENT DOCUMENTS

| | | | | |
|---|---|---|---|---|
| 6,149,066 | A | 11/2000 | Perry et al. | |
| 6,283,656 | B1 * | 9/2001 | Jiang | B60S 3/047 15/103 |
| 6,321,037 | B1 * | 11/2001 | Reid | A01M 21/04 392/475 |
| 7,190,890 | B2 | 3/2007 | Higham et al. | |
| 7,281,673 | B2 | 10/2007 | Burnworth et al. | |
| 11,235,341 | B2 * | 2/2022 | Daudish | B05B 1/24 |
| 2002/0127006 | A1 | 9/2002 | Tweedy et al. | |
| 2006/0260036 | A1 | 11/2006 | Stover | |
| 2013/0037624 | A1 * | 2/2013 | Helmsderfer | B05B 1/16 239/66 |
| 2013/0133702 | A1 * | 5/2013 | Reid | B05B 7/0416 134/30 |
| 2015/0289320 | A1 | 10/2015 | Long et al. | |
| 2015/0298962 | A1 | 10/2015 | Shelton et al. | |
| 2016/0334145 | A1 * | 11/2016 | Pahwa | F28F 13/185 |

* cited by examiner

| Nozzle Setting | Flow Rate (GPM) | Temperature Rise (°F) | | | | |
|---|---|---|---|---|---|---|
| Jet Flat | .25 | 49 | 115 * | 111 | 101 | 91 |
| Jet Flat Center | .4 | 30 | 102 | 92 | 82 | 72 |
| Jet Flat Shower | 1 | 12 | 84 | 74 | 64 | 54 |
| Ground Water | - | 0 | 72 | 62 | 52 | 42 |

* Set temperature limit is 115°F

Note: Temperatures displayed in table are based on national averages, actual temperature may vary +/- 10°F.

HEATED HOSE NOZZLE

CROSS-REFERENCE TO RELATED APPLICATIONS

This application is a continuation-in-part of, and claims priority to, U.S. patent application Ser. No. 15/968,212, filed 1 May 2018, the entire contents of which is incorporated by reference as if fully set forth below.

TECHNICAL FIELD

The disclosed technology relates generally to heated hose nozzles that are capable of heating water from a hose, and more particularly to a nozzle with apertures sized to facilitate heating groundwater to a sufficient temperature based on the expected temperature of the groundwater.

BACKGROUND

In use, one end of a typical garden hose is connected to an outdoor spigot while the other end is open or connected to a nozzle, such as a sprayer. When a nozzle is used on the end of the garden hose, the water comes under pressure and can be selectively dispensed from the nozzle. The temperature of the water running out of the spigot and thus, the nozzle, tends to be at the temperature of the ground. The temperature of the groundwater varies depending on where the groundwater is located. For example, groundwater in the Northeastern United States tends to be approximately 42° F. whereas the temperature of the groundwater in the Southeastern United States tends to be approximately 72° F. Furthermore, the temperature of the groundwater can change depending on the time of year.

For many applications, the temperature of the water supplied from the outdoor spigot is not important for the end use. In other applications, however, heated water is desirable or even necessary for the end use. Providing heated water to remote locations inside and outside a home can be challenging. For example, the tanks used to heat and store hot water do not tend to be connected to outdoor spigots. Because of this, few options are available for supplying heated water to remote locations. Furthermore, portable water heating systems are often unable to accurately account for the wide variations in groundwater temperature from one region to the next. Thus, although a portable heating system may be capable of sufficiently heating groundwater to an acceptable temperature in one region, the same portable heating system may be unable to sufficiently heat the groundwater in another region.

What is needed, therefore, is a way of heating a supply of water (e.g., from a common spigot or garden hose) by using a nozzle capable of accurately heating the water to a suitable temperature.

SUMMARY

The disclosed technology includes a hose nozzle assembly with apertures sized to facilitate heating groundwater to a sufficient temperature based on the expected temperature of the groundwater. The hose nozzle assembly can have a handheld enclosure having a handle portion and a body portion. The handle portion can be connected to the body portion and can be adapted to be gripped by a user. The hose nozzle assembly can include a heating chamber having an inlet, an outlet, and a heating element configured to heat a fluid. A spray nozzle can be connected to the body portion and can be configured to direct a flow of fluid from the body portion. The spray nozzle can include a first aperture configured to provide a first spray pattern at a first flow rate corresponding to a first change in temperature of fluid flowing through the heating chamber, and a second aperture configured to provide a second spray pattern at a second flow rate corresponding to a second change in temperature of fluid flowing through the heating chamber. The second flow rate can be less than the first flow rate and the second change in temperature can be greater than the first change in temperature.

The first aperture can be configured to facilitate heating the fluid with the heating element from a first inlet temperature to approximately a target temperature. The second aperture can be configured to facilitate heating the fluid with the heating element from a second inlet temperature to approximately the target temperature. The second inlet temperature can be less than the first inlet temperature.

The hose nozzle assembly can include a fluid inlet in fluid communication with the heating chamber and adapted for attachment to a hose, a valve in fluid communication with the fluid inlet and configured to control the flow of fluid, and a valve trigger for controlling the valve. The valve trigger can be configured to activate the heating element upon actuation of the trigger.

The hose nozzle assembly can further include an air vent in fluid communication with the heating chamber. The air vent can be configured to permit air to exit the heating chamber. The air vent can be proximate the outlet of the heating chamber.

The hose nozzle assembly can further include an outlet valve that can be configured to adjust a flow rate of the fluid exiting the spray nozzle. The outlet valve can be proximate the outlet of the heating chamber. The hose nozzle assembly can further include a flow straightener positioned between, and in fluid communication with, the outlet valve and the spray nozzle. The flow straightener can be configured to reduce a turbulence of the fluid flowing through the hose nozzle assembly.

The flow straightener can be configured to cause the fluid to achieve an approximately laminar flow prior to passing through the spray nozzle.

The heating element can be a sheathed heating element. The heating chamber can include a longitudinal axis extending therethrough and the sheathed heating element can extend at least partially into the heating chamber. A length of the sheathed heating element can be oriented parallel to the longitudinal axis of the heating chamber and a width of the sheathed heating element can be oriented perpendicular to a plane extending through the heating chamber in the direction of the handle portion.

The spray nozzle can be adapted for attachment to a hose. The hose nozzle assembly can further include a bimetal thermostatic switch configured to disable power to the heating element if a temperature of the fluid flowing through the hose nozzle assembly is greater than a maximum temperature.

The hose nozzle assembly can include a temperature sensor configured to detect a temperature of the fluid and a control board housed within the handheld enclosure, in communication with the temperature sensor, and configured to control a heat output of the heating element based on data received from the temperature sensor. The control board can be configured to modulate power to the heating element based on temperature data received from the temperature sensor. The control board can be configured to disable power to the heating element if a temperature of the fluid flowing through the hose nozzle assembly is greater than a maximum temperature.

The hose nozzle assembly can include a flow sensor that can be configured to detect a flow of the fluid through the heating chamber. The control board can be configured to modulate power to the heating element based on flow data received from the flow sensor. The hose nozzle assembly can include a temperature switch configured to adjust a temperature set point and the control board can be configured to control the heat output of the heating element based on the temperature set point.

These and other aspects, objects, features, and/or elements of the disclosed technology will be apparent from the following description and the appended claims.

BRIEF DESCRIPTION OF THE DRAWINGS

The drawings illustrate example hose nozzle assembly configurations within systems and are therefore not to be considered limiting in scope, as hose nozzle assembly configurations may admit to other equally effective applications. The elements and features shown in the drawings are not necessarily to scale, emphasis instead being placed upon clearly illustrating the principles of the disclosed technology. Additionally, certain dimensions or positions may be exaggerated to help visually convey such principles. In the drawings, reference numerals designate like or corresponding, but not necessarily identical, elements.

DETAILED DESCRIPTION

Figure 1:
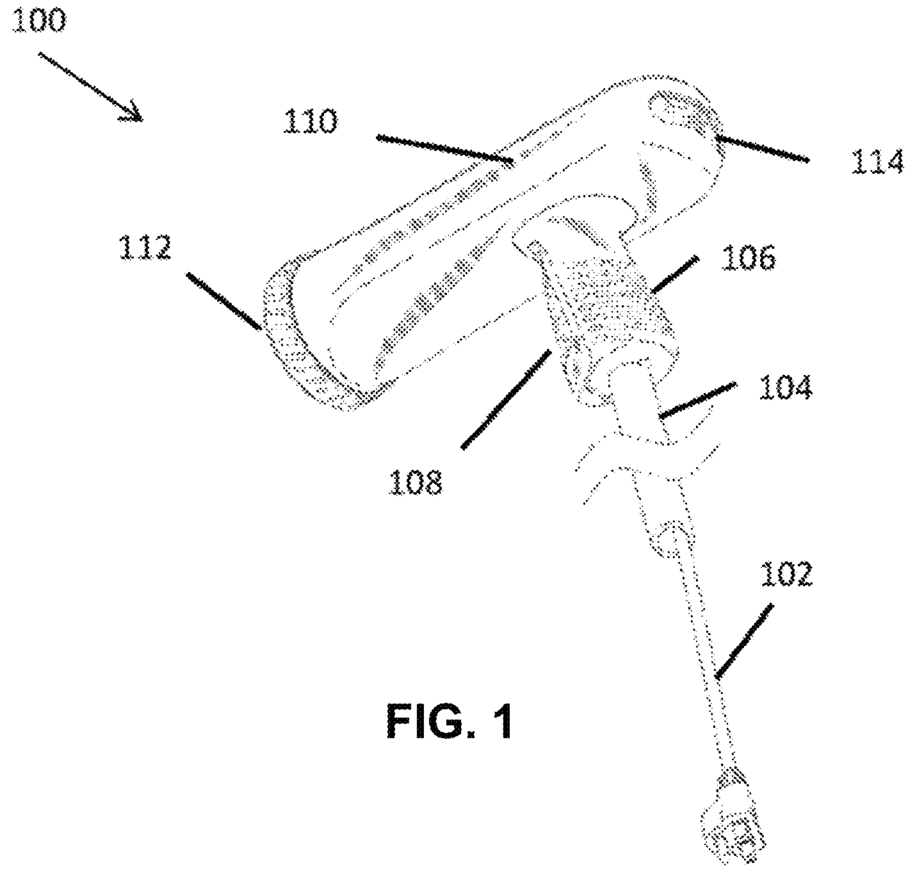
FIG. 1 is a bottom perspective view of an example hose nozzle assembly, in accordance with the disclosed technology.

Examples of the technology discussed herein are directed to hose nozzle assembly configurations. The disclosed technology, for example, includes a hose nozzle assembly capable of heating water to an acceptable temperature for multiple inlet temperatures of groundwater supplied to the hose nozzle assembly. The hose nozzle assembly can include a heating element that can heat the water and a nozzle and/or valve that can control a flow of the water through the hose nozzle assembly. The nozzle can have a plurality of apertures that can each be sized to control a flow of the water through the nozzle such that the water can be heated from an inlet temperature to approximately a target temperature depending on the temperature of the groundwater. For example, a first aperture can be sized to facilitate the heating element heating causing a first change in temperature of the water (e.g., a first temperature increase amount or $\Delta T1$) while a second aperture can be sized to facilitate the heating element causing a second change in temperature of the water (e.g., a second temperature increase amount or $\Delta T2$). The second change in temperature can be greater than the first change in temperature. In other words, the hose nozzle assembly can include apertures that are each designed to control a flow of the water through the hose nozzle assembly such that the groundwater is sufficiently heated to approximately a desired temperature for the end use depending on the expected temperature of the water (e.g., groundwater) supplied to the hose nozzle assembly.

Although various aspects of the disclosed technology are explained in detail herein, it is to be understood that other aspects of the disclosed technology are contemplated. Accordingly, it is not intended that the disclosed technology is limited in its scope to the details of construction and arrangement of components expressly set forth in the following description or illustrated in the drawings. The disclosed technology can be implemented and practiced or carried out in various ways. In particular, the presently disclosed subject matter is described in the context of being a handheld hose nozzle assembly for providing heated water. The present disclosure, however, is not so limited, and can be applicable in other contexts. The present disclosure, for example, can be used in residential, agricultural, industrial, or other setting where heated water is desired or necessary at locations where heated water is likely not readily available. Furthermore, although described as being "handheld," the disclosed technology can be implemented in other configurations that are not necessarily intended to be held by a user. Accordingly, when the present disclosure is described in the context of a handheld hose nozzle assembly for providing heated water, it will be understood that other implementations can take the place of those referred to.

Examples of the disclosed technology can be pre-fabricated or specifically generated (e.g., by shaping a malleable body) for a particular environment. Example of the technology can have standard or customized features (e.g., shape, size, features on the inner surface, pattern, configuration). Therefore, the examples described herein should not be considered limited to creation or assembly at any particular location and/or by any particular person. Additionally, a hose nozzle assembly (or components thereof) described herein can be made of one or more of a number of suitable materials.

As used herein, "connected" means two components are indirectly or directly connected to one another. For example, the two components could be connected to each other through the use of a coupling feature or could be directly threaded to each other. In another example, connected could mean connected through one or more wires.

As used herein, "attached" means two components are directly attached to one another, such as through threading one component directly to another.

As used herein, a "coupling feature" can couple, secure, fasten, abut, and/or perform other functions aside from merely coupling. A coupling feature as described herein can allow one or more components of a hose nozzle assembly to become coupled, directly or indirectly, to another portion of the hose nozzle assembly. A coupling feature can include, but is not limited to, a swage, a snap, a clamp, a portion of a hinge, an aperture, a recessed area, a protrusion, a slot, a spring clip, a tab, a detent, a compression fitting, and mating threads.

Any component described in one or more figures herein can apply to any other figures having the same label. In other words, the description for any component of a figure can be considered substantially the same as the corresponding component described with respect to another figure. For any figure shown and described herein, one or more of the components may be omitted, added, repeated, and/or substituted. Accordingly, embodiments shown in a particular figure should not be considered limited to the specific arrangements of components shown in such figure.

Example hose nozzle assemblies will be described more fully hereinafter with reference to the accompanying drawings, in which example embodiments of hose nozzle assemblies are shown. Hose nozzle assemblies may, however, be embodied in many different forms and should not be construed as limited to the examples set forth herein. Rather, these examples are provided so that this disclosure will be thorough and complete, and will fully convey the scope of hose nozzle assemblies to those of ordinary skill in the art. Like, but not necessarily the same, elements (also sometimes called components) in the various figures are denoted by like reference numerals for consistency.

Terms such as “first,” “second,” “top,” “bottom,” “left,” “right,” “end,” “back,” “front,” “side”, “length,” “width,” “inner,” “outer,” “above”, “lower”, and “upper” are used merely to distinguish one component (or part of a component or state of a component) from another. Such terms are not meant to denote a preference or a particular orientation unless specified and are not meant to limit embodiments of hose nozzle assemblies.

Although described throughout this disclosure as being a hose nozzle assembly configured to heat water, one of skill in the art will appreciate that, unless the context clearly indicates otherwise, the term “water” can refer to any fluid capable of being passed through the hose nozzle assembly and heated by the heating element. Thus, when the term “water” is used to describe specific features or functions of the hose nozzle assembly, one of skill in the art will appreciate that other fluid can be used without departing from the scope of this disclosure.

Numerous specific details are set forth herein in order to provide a more thorough understanding of the disclosure. However, it will be apparent to one of ordinary skill in the art that the invention may be practiced without these specific details. In other instances, well-known features have not been described in detail to avoid unnecessarily complicating the description.

Figure 2:
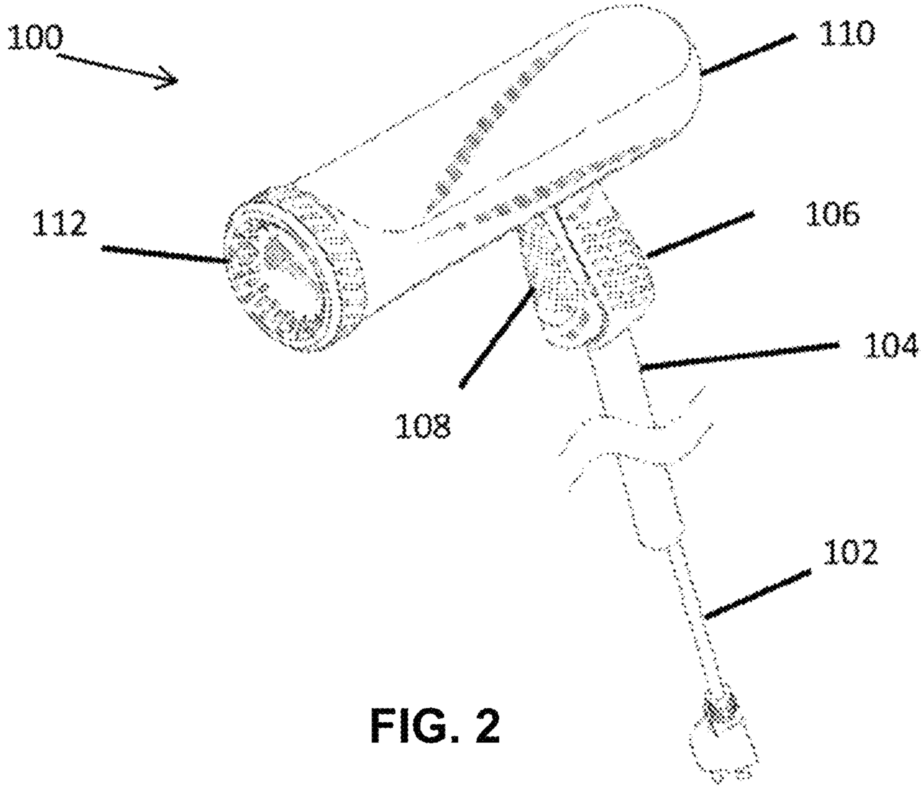
FIG. 2 is a top perspective view of an example hose nozzle assembly, in accordance with the disclosed technology.

FIG. 1 illustrates a bottom perspective view of a hose nozzle assembly 100. An electrical cord 102 is shown attached to the inlet 104 and the inlet 104 is connected to the handle 106. Alternatively, the inlet 104 can be a water hose that is connected to the handle 106. While many of the examples described herein relate to heating water, the hose nozzle assembly 100 can also be used to heat other liquids or mixtures of liquids. The inlet 104 is configured to let water into the hose nozzle assembly 100. The handle 106 can comprise grooves to increase grip. As shown, the handle 106 can include a trigger 108. Above the handle 106 can be the body 110 of the hose nozzle assembly 100 with one end of the body 110 comprising a nozzle sprayer 112. The nozzle sprayer can have a single nozzle or multiple nozzles that can be selected for varying spray patterns. Located on the user side of the body 110 is a switch 114. The switch 114 can be used to set the preferred water temperature for water exiting the nozzle sprayer 112. Upon compression or activation of the trigger 108, water can flow through the hose nozzle assembly 100, can be heated, and can flow out of the nozzle sprayer 112. The nozzle sprayer 112 can be rotatable such that different configurations of sprays can be selected by a user. FIG. 2 is a top perspective view of an embodiment of a hose nozzle assembly 100 illustrating the elements described in connection with FIG. 1.

The electrical cord 102 can enter the handle 106 or the body 110 separate from the inlet 104. The electrical cord 102 can be combined with the inlet 104, such as an attached hose. The electrical cord 102 can branch from the attached hose close to the handle 106 or can branch from the attached hose at the other end of the attached hose, or any length in between. The inlet 104, such as a hose, can be molded together with the electrical cord 102 in a seamless manner. The electrical cord 102 can end in a wire grounding plug. The plug can include a ground fault circuit interrupter or a residual current device. The hose nozzle assembly 100 can include an on/off switch or depressible power button. The electrical cord 102 can be a standard 120V electrical cord. The inlet 104 can comprise a coupler at the end of the inlet 104 away from the handle 106 of the hose nozzle assembly 100. An inlet coupler can be configured to attached to a common garden hose or spigot.

Figure 3:
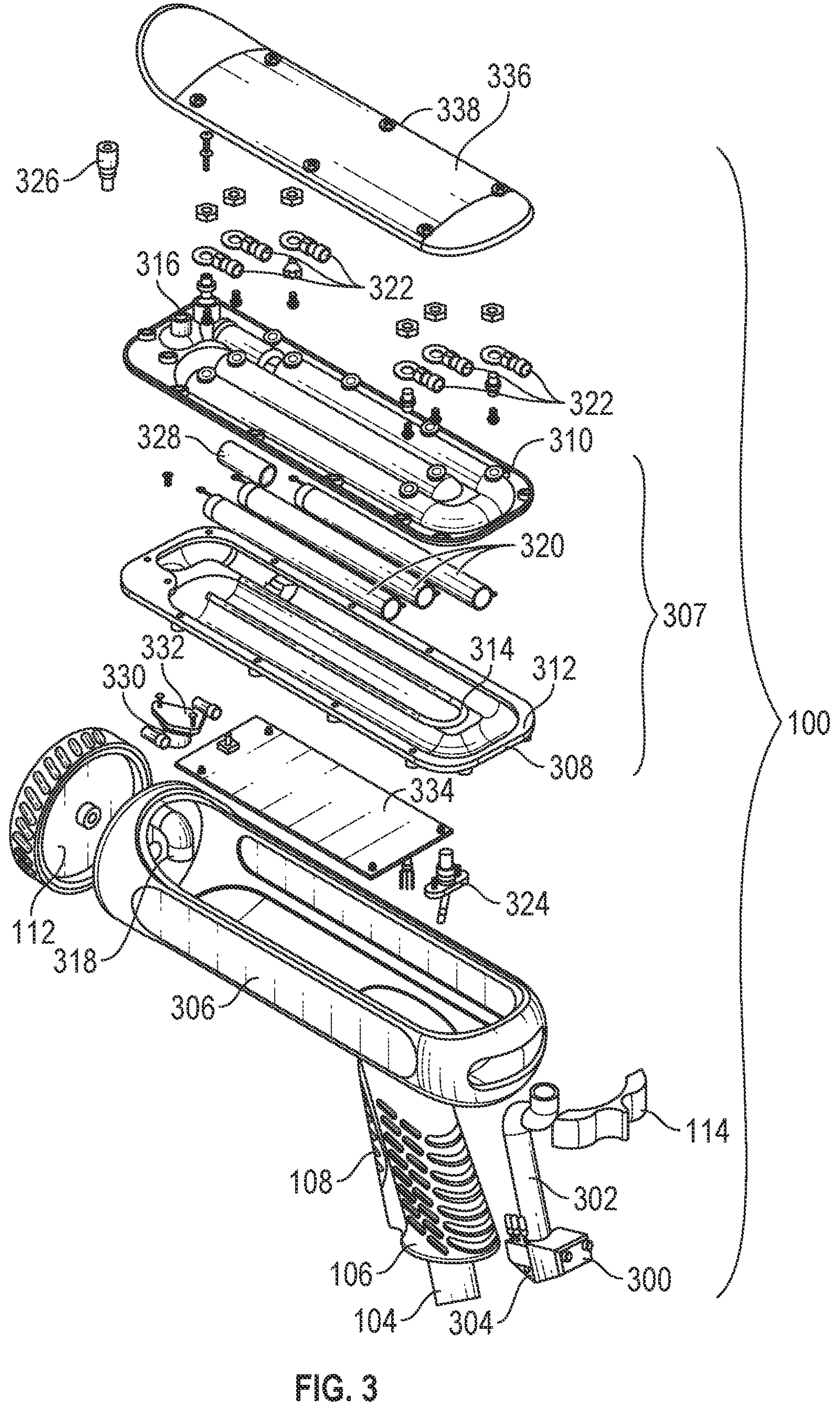
FIG. 3 is an exploded view of an example hose nozzle assembly, in accordance with the disclosed technology.

FIG. 3 is an exploded view of an embodiment of a hose nozzle assembly 100. Starting from the bottom of FIG. 3, the hose nozzle assembly 100 can include an inlet 104, handle 106, and trigger 108. Inside of the handle 106 can reside a valve 300 configured to cut off the flow of water from the inlet 104. When the valve 300 is actuated by the trigger 108 being depressed, the valve 300 can allow water flow from the inlet 104 into the valve tubing 302. A triac 304 can be installed to gate power through the hose nozzle assembly.

The handle 106 can be connected to a housing 306 that forms the majority of the body 110 of the hose nozzle assembly 100. A switch 114 can fit into the user end of the housing 306, and a nozzle sprayer 112 can be located on the opposing end of the housing 306. A heating chamber 307 can include a bottom section 308 and a top section 310, and the heating chamber 307 can be located within the housing 306. The bottom section 308 and top section 310 can be connected together with a gasket 312, which can make the heating chamber 307 watertight.

The heating chamber can include a fluid path and at least one heating element. The fluid path can have a variety of forms. As illustrated in FIG. 3, the fluid path can be formed in a spiral manner through the heating chamber 307 with a heating chamber inlet 314 connected to the valve tubing 302 and a heating chamber outlet 316 connected to outlet tubing 318. The heating element can include three bare wire heating elements 320 that are at least partially contained within the heating chamber 307. Each of the bare wire heating elements 320 can be within a section of the spiral. Each of the bare wire heating elements 320 can be connected to two termination rod wire connections 322, which can supply power and ground to the heating elements 320. The termination rod wire connections 322 can be connected to termination rods, which can be in turn connected to the bare wire heating elements 320 through termination screws. The other side of the termination rod wire connections 322 can be crimped to wires which receive power from the electrical cord 102.

The outlet tubing 318 can be connected to the nozzle sprayer 112, such that water flow can go through the outlet tubing 318 into the nozzle sprayer 112. A watertight fluid path can be formed from the inlet 104, through the valve 300, the valve tubing 302, the heating chamber 307, the outlet tubing 318, and the nozzle sprayer 112, releasing a spray of water.

Figure 4:
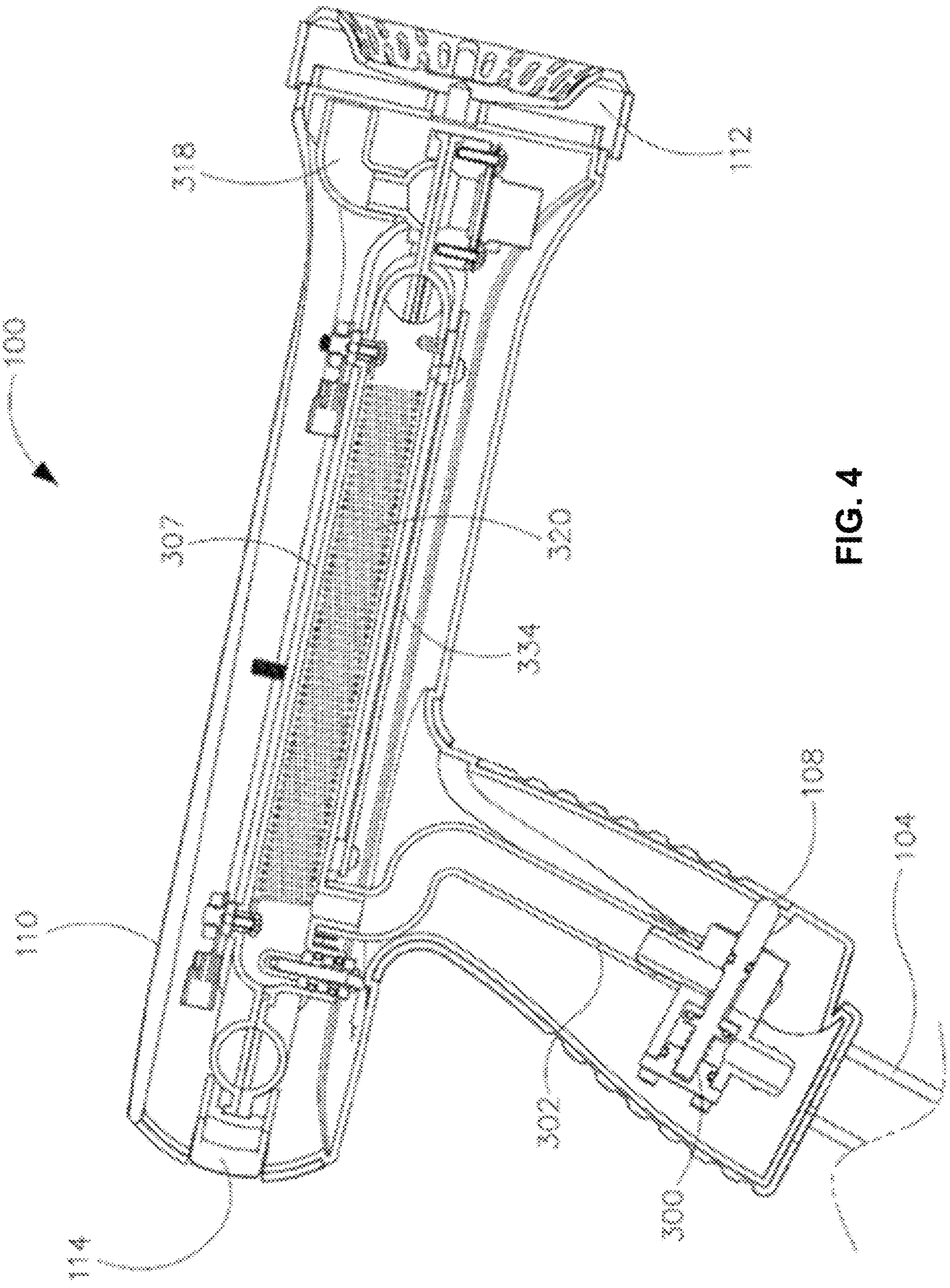
FIG. 4 is a cross section of an example hose nozzle assembly, in accordance with the disclosed technology.

The hose nozzle assembly 100 can include sensors. An inlet temperature sensor 324 can be located at the heating chamber inlet 314 and can be configured to measure the temperature of water flowing into the heating chamber 307. An outlet temperature sensor 326 can be located at the heating chamber outlet 316 and can be configured to measure the temperature of water flowing out of the heating chamber 307. A flow meter 328 can be located within the heating chamber 307 near the heating chamber outlet 316 and can be configured to measure the amount of water flowing out of the heating chamber 307. As an additional safety feature, an ECO switch 330 (electrical cutoff thermostatic switch in series with main power) and an ECO wire connector 332 can be included to measure the temperature of the water and/or to turn off power to the bare wire heating elements 320 if the temperature of the water exceeds 120° F. A control board 334 can be included in the housing 306 (e.g., at or near the bottom of the housing 306). The control board 334 can be connected to the inlet temperature sensor 324, outlet temperature sensor 326, flow meter 328, and/or bare wire heating elements 320. A cover 336 can be connected to the housing 306 through the use of screws 338. FIG. 4 illustrates a cross section of the hose nozzle assembly 100 illustrating the elements of FIG. 3 from a different view.

The handle 106, trigger 108, housing 306, switch 114, nozzle sprayer 112, and/or cover 336 can be made of any of one or more of a number of suitable materials. For example, one or more of these elements or components can be formed from plastic, such as ABS, nylon, or fiber reinforced nylon. The material(s) used to form one or more of these elements or components can be heat safe to at least 120 degrees F. The handle 106 and/or trigger 108 can be made to be used with one hand during operation of the hose nozzle.

The switch 114 can be configured to be adjustable, such that a user can set a preferred temperature for the outlet water. The switch 114 can be a multi-position switch such as a rotary potentiometer, potential switch, multi-position switch, rotary encoder, linear encoder, potentiometer or the like.

The inlet temperature sensor 324 and outlet temperature sensor 326 can be configured to sense the temperature of the water within a hose nozzle assembly 100. The inlet temperature sensor 324 and outlet temperature sensor 326 can be the same type of temperature sensor, or they can be different. The inlet temperature sensor 324 and outlet temperature sensor 326 can be a thermistor or a thermocouple, for example.

The flow meter 328 can be able to measure the flow of water through a hose nozzle assembly 100. For example, the flow meter 328 can be a magnetic turbine, paddle wheel, or vortex shedding.

The nozzle sprayer 112 can include a rotary dial used to select spray patterns. The different spray patterns can affect flow rates, which can affect the heating capacity of the heating elements. For example, lower flow rates can result in increased heating of water passing through the heating chamber 307, while higher flow rates can result in a lower temperature rise of water passing through the heating chamber 307. As a non-limiting example, the nozzle sprayer 112 can include 6-8 selectable spray patterns. Spray patterns defined by distinct apertures configured to provide distinct flow rates of water passing therethrough are described in greater detail below.

The heating chamber 307 can be made of a reinforced polymer, such as glass filled polymer. The material(s) used to form the heating chamber 307 can be heat safe to at least 120 degrees F. The termination rods can be made from stainless steel, brass, or nickel plated brass, for example.

The hose nozzle assembly 100 can include one or more heating elements. For example, there can be 1, 2, 3, 4, 5, 6, or more heating elements located within the heating chamber 307. The bare wire heating elements 320 (also known as resistant wire heating elements) can be made of Nichrome, Nikrothal, or FeCrAl. The bare wire heating elements 320 can be shaped like a spring. One, some, or all of the bare wire heating elements 320 can be shaped like a spring. One, some, or all of the bare wire heating elements can have varying numbers of coils or varying tension in the coils such that the watt density of a given bare wire heating element 320 is different from that of one or more other bare wire heating elements 320. The bare wire heating elements 320 can progressively decrease in watt density the closer to the heating chamber outlet 316 that each bare wire heating element 320 is positioned. Alternatively, the heating element 320 can be a sheathed heating element. As will be appreciated, a heating element 320 that is sheathed can be configured to convert electrical energy into thermal energy that can be transferred to the water in the heating chamber 307 without coming into direct contact with the water. In other words, heating element 320 can have a sheath separating a resistive heating element from the water in the heating chamber 307. In this way, the heating element 320 can be electrically isolated from the water passing through the heating chamber 307, helping to reduce current leakage. Furthermore, having a heating element 320 that is sheathed can help to reduce the likelihood that the heating element 320 would burn out if the heating element 320 is activated without water being present in the heating chamber 307.

Figure 5:
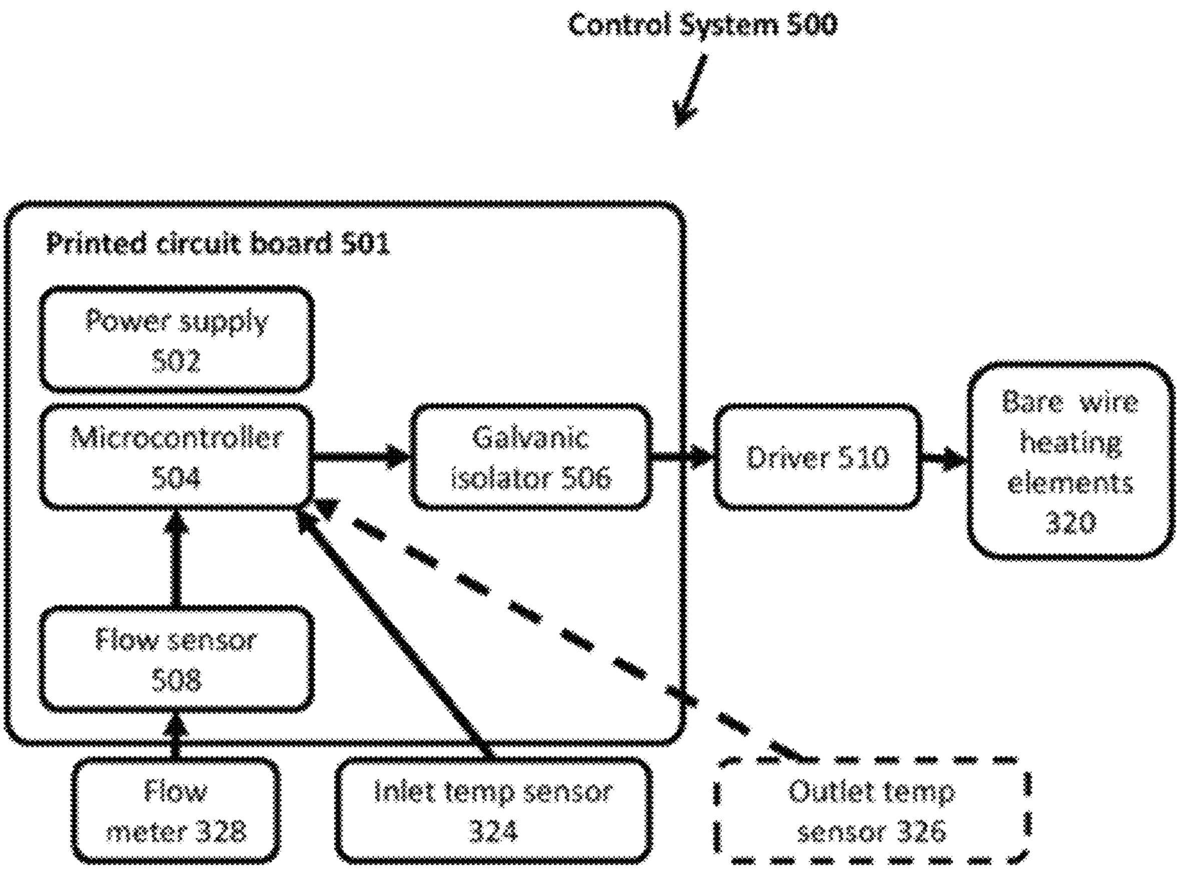
FIG. 5 is a block diagram of an example control system for a hose nozzle assembly, in accordance with the disclosed technology.

FIG. 5 is a block diagram of a control system 500 for the hose nozzle assembly 100. The control system 500 can be implemented on the example control board 334 shown in FIG. 3. A printed circuit board 501 can include a power supply 502, which can receive power via the electrical cord 102; a microcontroller 504; a galvanic isolator 506; and/or a flow sensor 508. The flow sensor 508 can receive data from the flow meter 328, which can be located near the heating chamber outlet 316. The microcontroller 504 can be programmable and can comprise one or more processor cores and memory. The galvanic isolator 506 can be used to isolate current flow. The galvanic isolator can be implemented as a transformer or optocoupler, for example.

The microcontroller 504 can receive input from the flow sensor 508, the inlet temperature sensor 324, and/or the outlet temperature sensor 326. The microcontroller can use one or more of the inputs it receives to control the heating elements. For example, the microcontroller 504 can provide control signals through a galvanic isolator 506 to a driver 510, which can provide power to the bare wire heating elements 320. The galvanic isolator 506 and driver 510 can be implemented as a triac 304. The triac 304 can receive a control signal (e.g., a 5V signal) from the microcontroller 504, which can cause the triac 304 to close to permit power (e.g., 120V) to flow from the electrical cord 102 to the bare wire heating elements 320.

Figure 6:
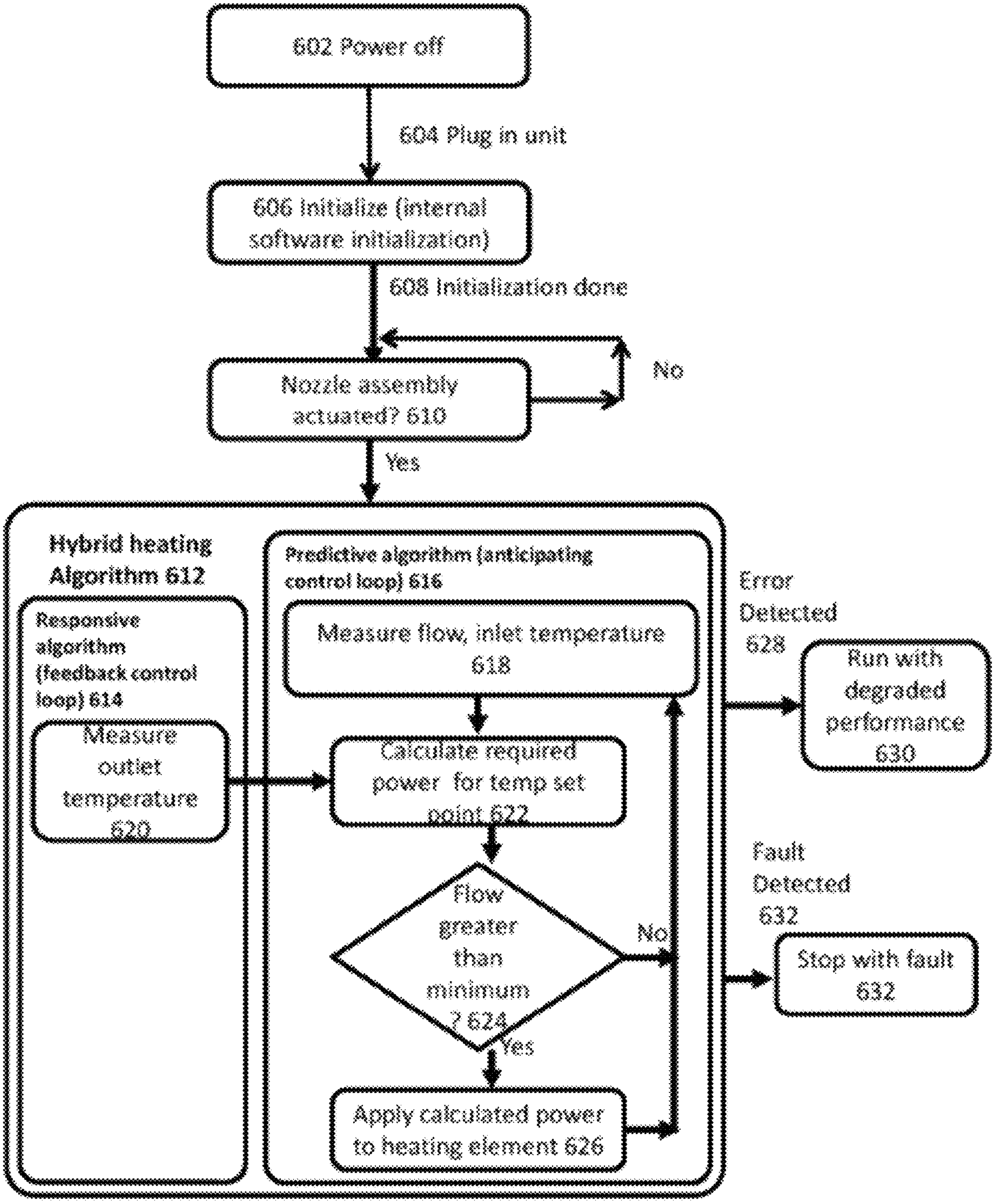
FIG. 6 is a flow chart for an example control method for a hose nozzle assembly, in accordance with the disclosed technology.

FIG. 6 is a flow chart of an example operation of the hose nozzle assembly 100. The hose nozzle assembly 100 can initially start unplugged with the power off (step 602). Once the electrical cord 102 is plugged in (step 604), the microprocessor can start initialization (step 606). Once initialization is complete and the hose nozzle assembly 100 is actuated (step 610), the control system 500 can enter into a hybrid heating algorithm 612. The hybrid heating algorithm 612 can include a responsive algorithm 614 and a predictive algorithm 616. The predictive algorithm 616 can be an anticipating control loop, which can receive the measured water flow from the flow sensor 508 and the inlet temperature from the inlet temperature sensor 324 (in step 618). The responsive algorithm 614, which can be a feedback control loop, can measure the outlet temperature from the outlet temperature sensor 326 (in step 620). The power required to heat the outlet water to a predetermined temperature set point (set by switch 114) can be calculated (e.g., by the microcontroller 504) given the sensor inputs (in step 622). If the flow, as measured by the flow sensor 508, is greater than a set minimum (in step 624), the microcontroller 504 can provide a control signal to apply the power calculated in step 622 to the heating element 626. If the microcontroller 504 detects an error in step 628 at any time, the hose nozzle assembly 100 can run with degraded performance (in step 630). If the microcontroller 504 detects a fault in step 632 at any time, the control system 500 can stop all heating with a fault (in step 632). The use of the hybrid heating algorithm 612 can allow for adjustments of power to the heating elements to be made on the fly as conditions change.

The hybrid heating algorithm can include determining if the outlet temperature, measured in step 620, is greater than a predetermined maximum temperature, which can be 100° F., 105° F., 110° F., 115° F. 120° F., 125° F., 130° F., or 140° F., as non-limiting examples. If the outlet temperature is greater than the predetermined maximum temperature, the microcontroller 504 can turn off power to the heating element until the outlet temperature, measured in step 620, is less than the predetermined maximum temperature. The minimum flow setting (compared in step 624) can be between 0.1-0.25 gpm, for example. The microcontroller 504 can monitor for irregular flow of fluid and can delay activating the heating element if irregular fluid flow is detected.

A predetermined temperature set point can be set from the switch 114. As a non-limiting example, the switch can have 2-6 selectable temperature set points that can range from 50 to 115° F. Alternatively, the predetermined temperature set point can be a constant.

The nozzle assembly can be actuated through depression of the trigger 108. Alternatively, the actuation of the nozzle assembly could be from an additional depressible button or a power switch. Alternatively or in addition, the actuation of the nozzle assembly could be triggered when the flow sensor 508 senses a steady flow of water or when the flow sensor senses flow above a certain amount, such as 0.1-0.25 gpm. A secondary on/off switch can be included such that the switch must be on and the trigger 108 depressed to actuate the hose nozzle assembly 100 (step 610). Depression of the trigger 108 can both open the valve 300 for the inlet flow of water and also actuate the hybrid heating algorithm 612.

Figure 7:
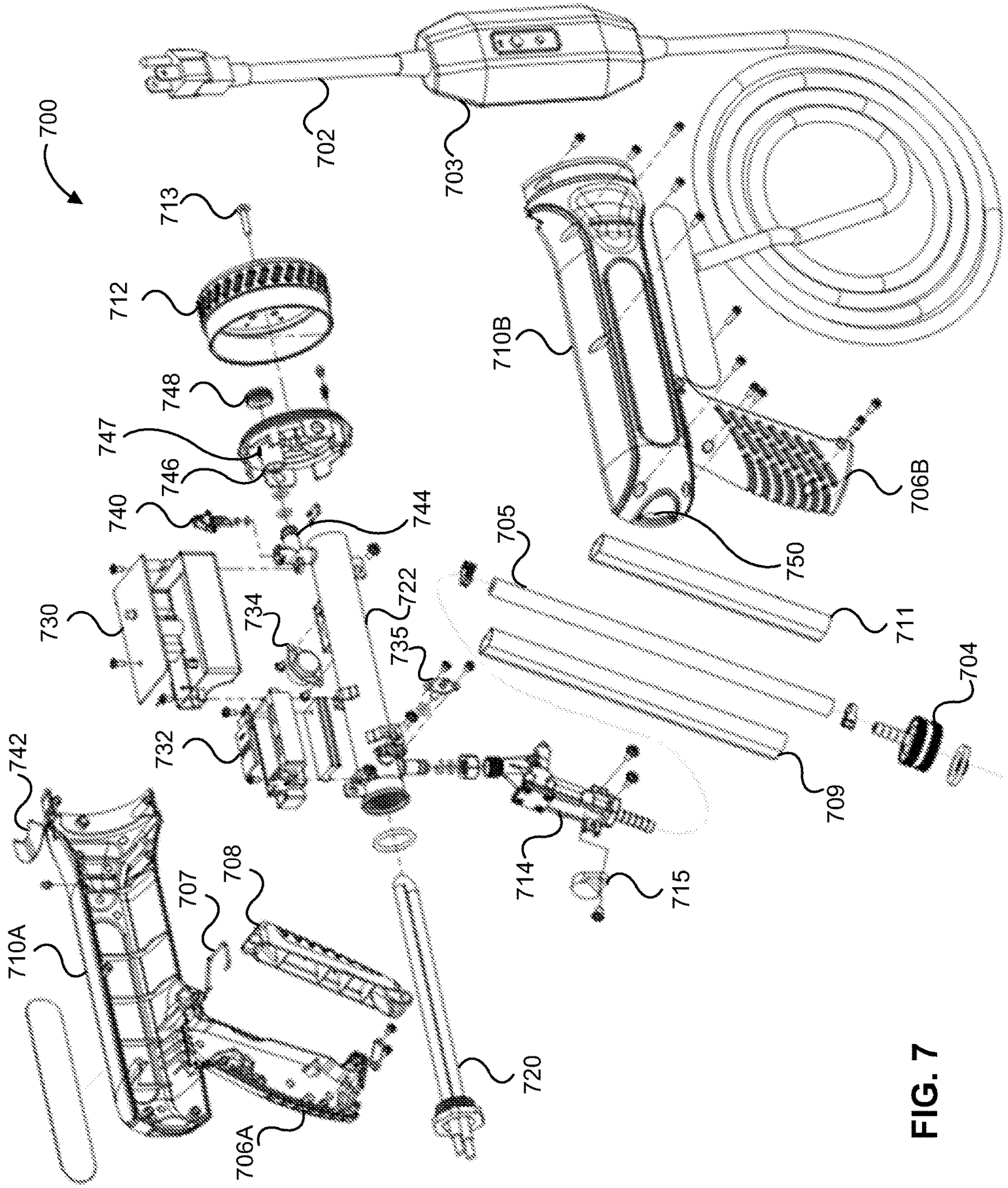
FIG. 7 is an exploded view of another example hose nozzle assembly, in accordance with the disclosed technology.

FIG. 7 is an exploded view of another example hose nozzle assembly 700, in accordance with the disclosed technology. The hose nozzle assembly 700 can be configured to heat water from an inlet temperature (i.e., the temperature of the water supplied to the hose nozzle assembly 700) to a higher temperature when in use. As will be appreciated, because the inlet temperatures of the water can vary depending on the region where the groundwater is supplied, the hose nozzle assembly 700 may need to heat the water by varying degrees depending on the end use and/or location of use. For example, if the hose nozzle assembly 700 is used in the Northeastern United States, the water supplied to the hose nozzle assembly 700 may be at a temperature of about 42° F. (the approximate temperature of the groundwater in areas of the Northeastern United States). On the other hand, if the hose nozzle assembly 700 is used in the Southeastern United States, the water supplied to the hose nozzle assembly 700 may be at a temperature of about 72° F. (the approximate temperature of the groundwater in areas of the Southeastern United States). Thus, if the user desires to deliver a water temperature of about 90° F., the heating element 720 will typically be required to add more heat energy to heat water to the desired temperature of 90° F. when operated in the Northeastern United States (e.g., water having a temperature of 42° F.) than when operated in the Southeastern United States (e.g., water having a temperature of 72° F.).

The change in temperature of the water as it passes through the hose nozzle assembly 700 can be affected by apertures formed in a nozzle sprayer 712 and/or an outlet valve assembly 744 as will be described in greater detail herein. The apertures formed in the nozzle sprayer 712 can each be sized to restrict a flow of the water through a heating chamber 722 of the hose nozzle assembly 700 such that the heating element 720 is able to cause the temperature of the water to be heated from a first temperature to a second temperature that is greater than the first temperature. For example, an aperture allowing for greater flow rates of water through the heating chamber 722 will reduce the amount of heat energy that the heating element 720 is able to supply to the water at its maximum output while an aperture restricting the flow through the heating chamber 722 to comparatively lower flow rates will allow for a comparatively greater amount of heat energy to be transferred to the water when the heating element 720 is at its maximum output. In other words, if the heating element 720 is operating at its maximum output and an aperture of the nozzle sprayer 712 that permits a lesser flow rate (as compared to another aperture of the nozzle sprayer 712 that permits a greater flow rate) is selected, the water can remain in the heating chamber 722 longer (as compared to water flowing through the other aperture permitting the greater flow rate), thereby permitting the water to become heated to a higher temperature than water flowing through the aperture of the nozzle sprayer 712 that permits a greater flow rate.

Stated otherwise, the nozzle sprayer 712 can include a plurality of apertures, and the plurality of apertures can include a first aperture and a second aperture. The first aperture can be configured to permit a first flow rate, and the second aperture can be configured to permit a second flow rate that is greater than the first flow rate. The first flow rate can correspond to a first residency duration of water within the heating chamber 722 (i.e., the amount of time during which the water is located within the heating chamber 722). The second flow rate can correspond to a second residency duration of water within the heater chamber 722, and the second residency duration can be less than the first residency duration. Accordingly, the first aperture, which corresponds to the first flow rate and the first residency duration, can correspond to a first amount of heat energy transfer from the heating element 720 to the water, and the second aperture, which corresponds to the second flow rate and the second residency duration, can correspond to a second amount of heat energy transfer from the heating element 720 to the water, with the first amount of heat energy transfer being greater than the second amount of heat energy transfer. The plurality of apertures can include one or more additional apertures, and each of the additional apertures can correspond to a respective intermediary flow rate (i.e., between the first and second flow rates), a respective intermediary residency duration (i.e., between the first and second residency durations), and a respective intermediary amount of heat energy transfer (i.e., between the first and second amounts of heat energy transfer).

As illustrated in FIG. 7, the hose nozzle assembly 700 can include a casing formed of two halves and having a handle portion 706A, 706B and a body portion 710A, 710B. Similar to the hose nozzle assembly 100, the handle portion 706A, 706B can be attached to the body portion 710A, 710B at an angle such that a user can grip the handle portion 706A, 706B and aim the hose nozzle assembly 700 in a desired direction. The nozzle sprayer 712 can be attached to the body portion 710A, 710B by a fastener 713. As will be appreciated, the hose nozzle assembly 700 can be assembled using various fasteners and/or adhesives. Thus, although several fasteners are illustrated in FIG. 7, a discussion of each fastener is omitted for the sake of simplicity.

The hose nozzle assembly 700 can include an electrical cord 702 having a ground fault circuit interrupter (GFCI) 703. As will be appreciated by one of skill in the art, the GFCI 703 can be configured to shut off electrical power supplied to the hose nozzle assembly 700 if an imbalance of electrical current is detected, thereby reducing the likelihood that a user of the hose nozzle assembly may be shocked or injured. The electrical cord 702 can have any suitable length such that the hose nozzle assembly 700 can be used a suitable distance away from an electrical outlet.

The hose nozzle assembly 700 can include a hose adapter 704 that can function as an inlet of the hose nozzle assembly and can be sized to facilitate connection of the hose nozzle assembly 700 to a suitable hose or other water source. In this way, the hose adapter 704 can be configured to facilitate connection of the hose nozzle assembly to a common garden hose or spigot, for example. Alternatively, the hose adapter 704 can be a quick connect fitting, a barbed fitting, a compression fitting, a crimp fitting, a flare fitting, a flange fitting, a threaded fitting, or any other suitable fitting or adapter for the application. The hose adapter 704 can be connected to the hose nozzle assembly 700 proximate an inlet end of the hose nozzle assembly 700. For example, the hose adapter 204 can be proximate a bottom end of a handle portion 706A, 706B such that the water enters the bottom end of the handle portion 706A, 706B.

The hose adapter 704 can be connected to a hose extension 705 that can extend through the handle portion 706A, 706B to direct the water from the hose adapter 704 to an inlet valve assembly 714. A braided sleeve 709 can be placed around at least part of the hose extension 705 to provide reinforcement to the hose extension 705. An insulative sleeve 711 can also be placed around at least part of the hose extension 705 to help thermally isolate the hose extension 705 from the handle portion 706A, 706B.

The inlet valve assembly 714 can be configured to control a flow of the water through the hose nozzle assembly 700. The inlet valve assembly 714 can be actuated by a trigger 708 of the hose nozzle assembly 700. The trigger 708 and the inlet valve assembly 714 can be configured such that a user may grip the handle portion 706A, 706B and squeeze the trigger to open the inlet valve assembly 714 to permit the water to flow through the hose nozzle assembly 700. The trigger 708 can be further configured to cause the heating element 720 to activate based on actuation of the trigger 708. For example, the heating element 720 can be activated when a user squeezes the trigger 708. A clip 707 can be connected to the hose nozzle assembly 700 proximate the trigger 708 such that the clip 707 can be placed over at least a portion of the trigger 708 and configured to prevent the trigger 708 from moving back to a position where the inlet valve assembly 714 would close and prevent the water from flowing through the hose nozzle assembly 700. In other words, the clip 707 can cause the trigger 708 to continue to engage the inlet valve assembly 714 and permit water to flow through the hose nozzle assembly 700 until the clip 707 is disengaged.

The hose nozzle assembly 700 can include a heating element 720 configured to heat water within the heating chamber 722. The heating element 720 can be a bare wire heating element similar to the bare wire heating elements 320 described previously. Alternatively, the heating element 720 can be a sheathed heating element. As will be appreciated, a heating element 720 that is sheathed can be configured to convert electrical energy into thermal energy that can be transferred to the water in the heating chamber 722 without coming into direct contact with the water. In other words, heating element 720 can have a sheath separating a resistive heating element from the water in the heating chamber 722. In this way, the heating element 720 can be electrically isolated from the water passing through the heating chamber 722, helping to reduce current leakage and the likelihood that the GFCI 703 will trip and shut off the heating element 720. Furthermore, having a heating element 720 that is sheathed can help to reduce the likelihood that the heating element 720 would burn out if the heating element 720 is activated without water being present in the heating chamber 722.

The heating element 720 can be mounted in the heating chamber 722 in any suitable orientation to ensure the water is suitably heated. As a non-limiting example, the heating chamber 722 can have a longitudinal axis extending therethrough and the heating element 720 can be mounted in the heating chamber 722 such that a length of the heating element 720 can be oriented parallel to the longitudinal axis of the heating chamber 722. Furthermore, the heating element 720 can have a first width and a second width, the first width being greater than the second width. The heating element 720 can be mounted in the heating chamber 722 such that the first width is oriented perpendicularly to a plane extending through the heating chamber 722 toward the handle portion 706A, 706B (e.g., the largest width of the heating element 720 can be parallel to the ground when a user orients the hose nozzle assembly 700 such that the body portion 710A, 710B is parallel to the ground and the handle portion 706A, 706B is perpendicular to the ground). In this way, the water entering the heating chamber 722 can pass around and between the heating element 720 to help facilitate better heat transfer.

The heating chamber 722 can be any suitable shape or configuration for the application. For example, the heating chamber 722 can have a spiral design similar to the heating chamber 703 as illustrated in FIG. 3 and previously described, or the heating chamber 722 can be a simple cylindrical tube. The heating chamber 722 can receive water from the inlet valve assembly 714, direct the water across the heating element 720, and permit the water to pass through an outlet valve assembly 744 to deliver the heated water for an end use. The heating chamber 722 can be insulated to help prevent heat from being lost to the environment and to help thermally isolate the heating element 720 from the body portion 710A, 710B and the other components.

The outlet valve assembly 744 can be configured to control a flow of the water through the heating chamber 722 and, consequently, a pressure of the water within the heating chamber 722. By controlling a flow of the water through the heating chamber 722, the outlet valve assembly 744 can be used to adjust the temperature of the water that is permitted to exit the hose nozzle assembly 700. For example, by reducing the flow rate of the fluid through the heating chamber 722, the outlet valve assembly 744 can cause the water to remain in the heating chamber 722 longer such that the water is heated to a higher temperature. Alternatively, by increasing the flow rate of the water through the heating chamber 722, the outlet valve assembly 744 can cause the water to pass through the heating chamber 722 faster such that the water is heated to a lower temperature than when the water is at a higher flow rate.

Figure 8:
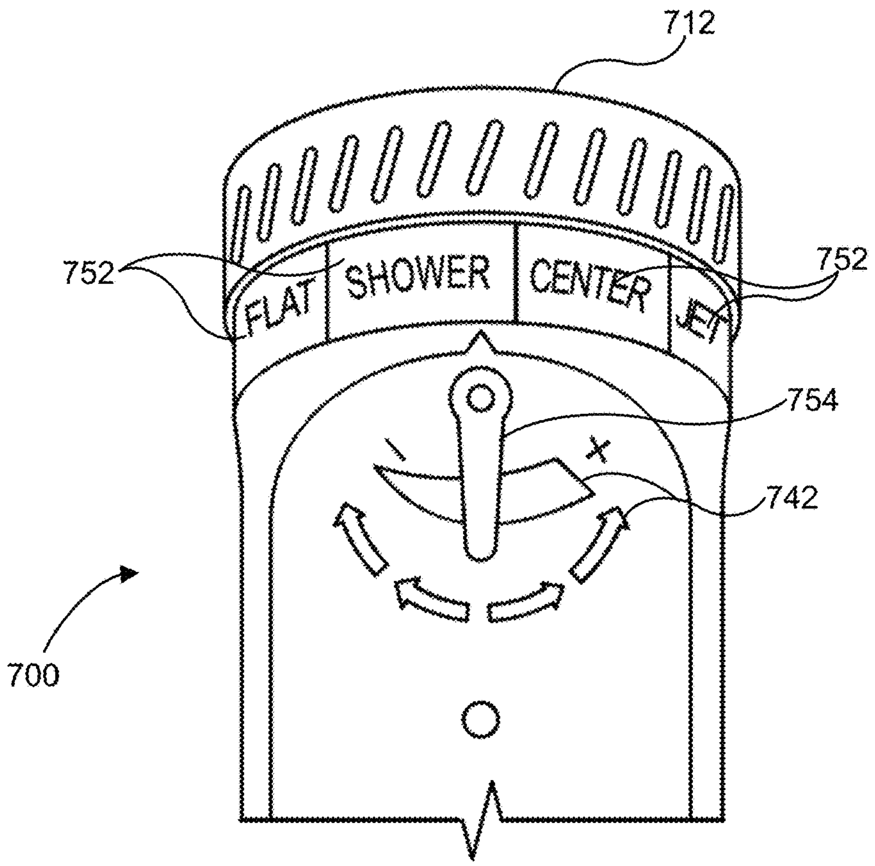
FIG. 8 is a top view of an end of an example hose nozzle assembly, in accordance with the disclosed technology.

The outlet valve assembly 744 can include a valve actuator 740 that can be mounted on the body portion 710A, 710B and extend inwardly into the body portion 710A, 710B to connect the valve actuator 740 to the outlet valve assembly 744. The valve actuator 740 can be configured such that a user can adjust a position of the outlet valve assembly 744 to alter the flow rate of the water through the hose nozzle assembly 700. For example, as illustrated in FIG. 8, the valve actuator 740 can have a valve actuator handle 754 that can be moved in one direction or another direction to change a position of the outlet valve assembly 744 to increase or decrease a flow of the water through the hose nozzle assembly 700. An outlet valve position indicator 742 can be placed on the top of the body portion 710A, 710B to enable a user to view a position setting of the outlet valve assembly 744. Alternatively or in addition, the outlet valve position indicator 742 can indicate whether moving the outlet valve assembly 744 will correlate to changing a flow rate of the water or will correlate to changing an outlet temperature of the water.

The outlet valve assembly 744 can be connected to a flow straightener 746 that can be configured to straighten the flow of the water after passing through the outlet valve assembly 744 and prior to passing through the nozzle sprayer 712. The flow straightener 746 can be configured to straighten the flow of the water before the water is delivered to the nozzle sprayer 712. In this way, the flow straightener 746 can help ensure the stream of water that is delivered from the nozzle sprayer 712 provides a suitable pattern of water spray when it exits the nozzle sprayer 712. As will be appreciated, by straightening the flow of water prior to the water being passed through the nozzle sprayer 712, any turbulence of the flow of water can be reduced, resulting in a more reliable spray pattern of the water passing through the nozzle sprayer 712. For example, the flow straightener 746 can be configured to cause the water to achieve an approximately laminar flow prior to passing through the nozzle sprayer 712. Furthermore, the hose nozzle assembly 700 can have a gasket 748 between the flow straightener 746 and the nozzle sprayer 712 to help prevent water from exiting the hose nozzle assembly 700 through locations other than the nozzle sprayer 712.

The hose nozzle assembly 700 can further include an air vent 747 that can be configured to allow air to escape the heating chamber 722. As will be appreciated by one of skill in the art, when the hose nozzle assembly 700 is first connected to a water source (e.g., a garden hose), air may be delivered along with the water to the hose nozzle assembly 700. If air becomes trapped in the heating chamber 722, the heating element 720 can overheat and become damaged. The air vent 747 can allow for the air to escape the heating chamber 722 without needing the outlet valve assembly 744 to be opened and water to be delivered through the nozzle sprayer 712. The air vent 747 can be positioned proximate the outlet of the heating chamber 722 to allow the air to escape the heating chamber 722.

Similar to the hose nozzle assembly 100, the hose nozzle assembly 700 can further include a controller 730, a triac 732, a flow sensor 715, and/or one or more temperature sensors 734 (e.g., an inlet temperature sensor and an outlet temperature sensor). The controller 730 and the triac 732 can be configured to control the heating element 720 according to any of the methods described previously in relation to the microcontroller 504 and the triac 304. For example, the controller 730 can be configured to receive temperature data from the temperature sensor 734 and flow data from the flow sensor 715 and control an output of the heating element 720 to ensure the water exiting the nozzle sprayer 712 is sufficiently heated. Furthermore, the controller 730 can control the heating element 720 based on the responsive algorithm 614 and/or the predictive algorithm 616 described herein.

The controller 730 can be configured to control an output of the heating element 720 based on a predetermined temperature set point. The predetermined temperature set point can be pre-programmed in a memory of the controller 730 or the hose nozzle assembly 700 can include a temperature selection switch or setting that allows a user to select a desired outlet temperature (i.e., change a temperature set point). For example, a user can select a desired outlet temperature by changing a position of a temperature selection switch 750. The controller 730 can then control an output of the heating element 720 based on the selected temperature set point as indicated by the temperature selection switch 750.

In addition to the methods of heating the water as described previously, the controller 730 can be further configured to control a position of the outlet valve assembly 744 to increase or decrease a flow rate of the water through the heating chamber 722. For example, if the controller 730 determines, based on temperature data received from the temperature sensor 734 and/or flow rate data received from the flow sensor 715, that the temperature of the water exiting the heating chamber 722 should increase, the controller 730 can output a control signal to the outlet valve assembly 744 to cause the outlet valve assembly 744 to actuate and reduce a flow of the water through the heating chamber, thereby increasing the temperature of the water exiting the heating chamber 722. Similarly, if the controller 730 determines, based on temperature data received from the temperature sensor 734 and/or flow rate data received from the flow sensor 715, that the temperature of the water exiting the heating chamber 722 should decrease, the controller 730 can output a control signal to the outlet valve assembly 744 to cause the outlet valve assembly 744 to actuate and increase a flow of the water through the heating chamber, thereby decreasing the temperature of the water exiting the heating chamber 722.

The controller 730 can be further configured to modulate an output of the heating element 720 to control the temperature of the water exiting the heating chamber 722. For example, the controller 730 can determine that the output of the heating element 720 should be reduced based on the temperature data indicating that the water exiting the heating chamber 722 is too high (and vice-versa). Similarly, the controller 730 can determine that the output of the heating element 720 should be reduced based on the flow data indicating that the flow rate of the water passing through the heating chamber 722 is too low (and vice-versa). Furthermore, as described previously, the triac 732 can be configured to turn off power to the heating element 720 if the temperature exceeds a high temperature threshold.

Although not shown in FIG. 7, the hose nozzle assembly 700 can further include a bypass valve and a mixing chamber to control an outlet temperature of the water. The bypass valve can be integrated with, or separate from, the inlet valve assembly 714. Similarly, the mixing chamber can be integrated with, or separate from, the heating chamber 722. The controller 730 can be configured to control a position of the bypass valve based on temperature data and/or flow data. As a non-limiting example, if the controller 730 determines that the temperature of the water exiting the heating chamber 722 exceeds a high temperature threshold, the controller 730 can actuate the bypass valve to allow cool water entering the hose nozzle assembly 700 to bypass the heating chamber and mix with the heated water exiting the heating chamber 722 to reduce the temperature of the water exiting the nozzle sprayer 712. In other examples, the bypass valve can be configured to actuate without requiring input from the controller 730. For example, the bypass valve can include a bimetallic disc or other similar thermostatic actuator to cause the bypass valve to automatically open if the outlet temperature of the water exceeds a threshold temperature.

FIG. 8 is a top view of and end of the hose nozzle assembly 700, in accordance with the disclosed technology. As described previously, the hose nozzle assembly 700 can include an outlet valve assembly 744 having a valve actuator handle 754 and outlet valve position indicator 742 to indicate a current setting of the outlet valve assembly 744. The hose nozzle assembly 700 can further include one or more spray pattern indicators 752 that can indicate a current setting of the spray nozzle 712. For example, the spray pattern indicators 752 can include settings that indicate the spray pattern that can be expected when water exits the nozzle sprayer 712. The spray pattern indicators 752 can be, for example and not limitation, related to a "flat" pattern, a "shower" pattern, a "center" pattern, a "jet" pattern, etc. The spray pattern indicators 752 can be color coded or otherwise marked to indicate which setting should be used based on the expected inlet temperature (as will be described in greater detail with relation to FIG. 10). As a non-limiting example, the spray pattern indicators 752 can include multiple indicators to each of the "flat" pattern, "shower" pattern, "center" pattern, "jet" pattern indicators that can be color coded to show which setting should be used based on the expected inlet temperature.

Figure 9:
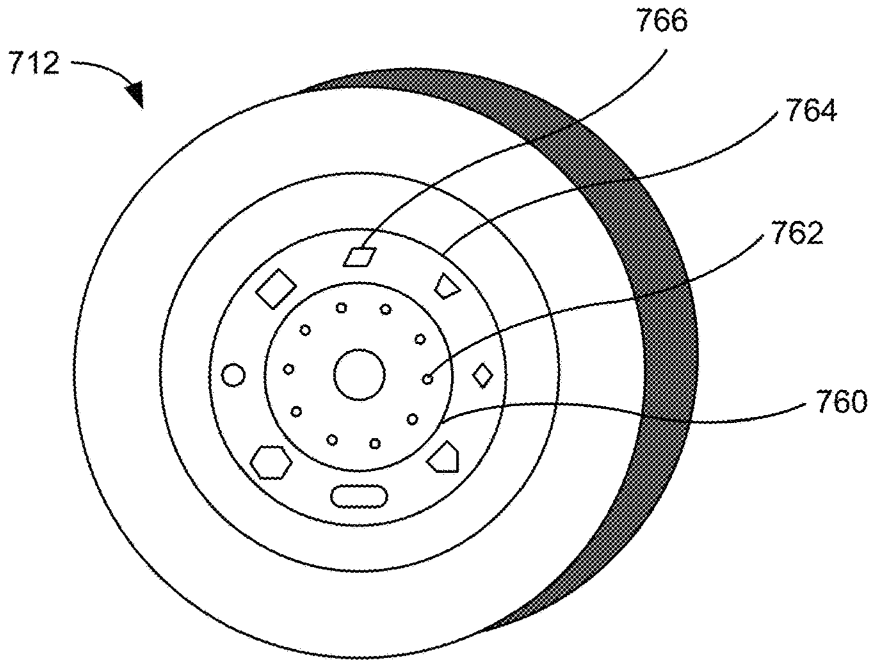
FIG. 9 is a perspective view of an example nozzle sprayer, in accordance with the disclosed technology.

FIG. 9 is a perspective view of a nozzle sprayer 712, in accordance with the disclosed technology. The nozzle sprayer 712, as described previously, can include one or more apertures that affect the flow rate of the water through the heating chamber 722. The apertures can be sized to affect the flow rate of the water through the heating chamber 722. Alternatively, or in addition, the apertures for a particular setting can include a greater or a lesser number of apertures to affect the flow rate of the water through the heating chamber 722.

As a non-limiting example, the nozzle sprayer 712 can include a center portion 760 having center portion apertures 762 configured to produce a shower type pattern when the "center" pattern setting is selected. The center portion 760 can have one or more settings to produce the "center" pattern at different flow rates based on the expected inlet temperature. In other words, the center portion 760 can have a first set of center portion apertures 762 that permit the water to exit the nozzle sprayer 712 at a first flow rate, thereby affecting the flow rate of the water in the heating chamber 722 and corresponding to a first temperature change of the water in the heating chamber 722. The center portion 760 can further include at least a second set of center portion apertures 762 that permit the water to exit the nozzle sprayer 712 at a second flow rate, thereby affecting the flow rate of the water in the heating chamber 722 and corresponding to a second temperature change of the water in the heating chamber 722. The second flow rate, for example, can be less than the first flow rate and correspond to a greater temperature increase than the temperature increase associated with the first flow rate.

The nozzle sprayer 712 can further include at least an outer portion 764 having outer portion apertures 766 configured to produce various types of patterns when a particular setting is selected. For example, the outer portion apertures 766 can include apertures arranged to produce a "flat" pattern, a "shower" pattern, a "jet" pattern, etc. The outer portion 764 can have one or more settings to produce each respective pattern at different flow rates based on the expected inlet temperature. In other words, the outer portion 764 can have a first set of outer portion apertures 766 that correspond to a first "flat" pattern and permit the water to exit the nozzle sprayer 712 at a first flow rate, thereby affecting the flow rate of the water in the heating chamber 722 and corresponding to a first temperature change of the water in the heating chamber 722. The outer portion 764 can further include at least a second set of outer portion apertures 766 that correspond to a second "flat" pattern and permit the water to exit the nozzle sprayer 712 at a second flow rate, thereby affecting the flow rate of the water in the heating chamber 722 and corresponding to a second temperature change of the water in the heating chamber 722. The second flow rate, for example, can be less than the first flow rate and correspond to a greater temperature increase than the temperature increase associated with the first flow rate.

Figure 10:
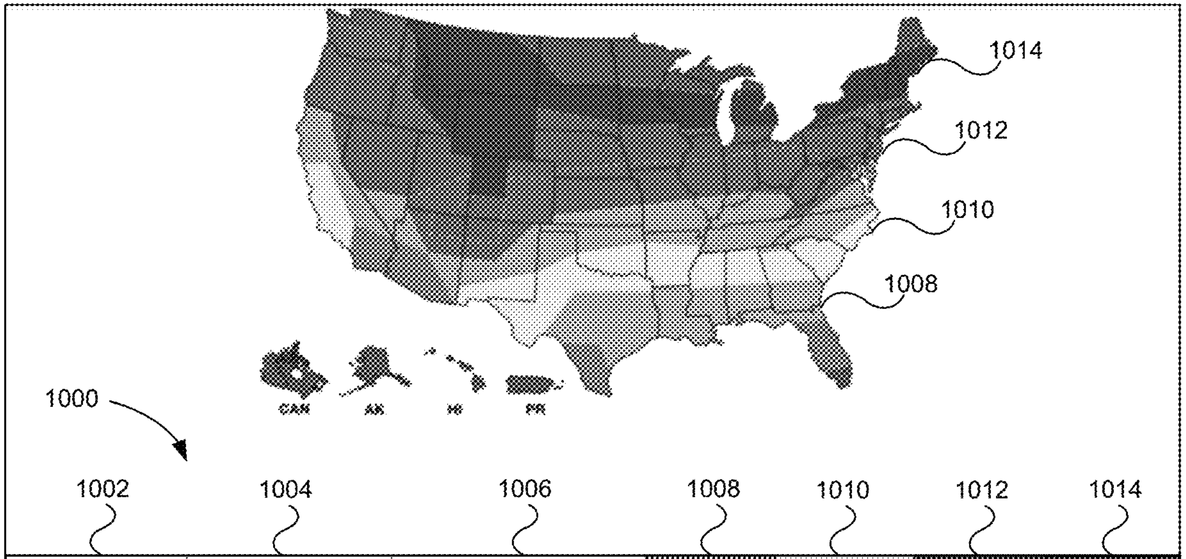
FIG. 10 is a table and related map illustrating expected output water temperatures depending on the temperature of the groundwater and the setting of the nozzle sprayer, in accordance with the disclosed technology.

FIG. 10 is a drawing depicting expected output temperatures depending on the temperature of the groundwater and the setting of the nozzle sprayer, in accordance with the disclosed technology. As shown in FIG. 10, the expected groundwater temperature can vary depending on the region where the groundwater is supplied from. As a non-limiting example, the United States can be divided into various regions based on the expected groundwater temperature including a first region 1008, a second region 1010, a third region 1012, a fourth region 1014, etc. As shown in the bottom row of the table in FIG. 10, the expected groundwater temperature in the first region 1008 can be approximately 72° F., the expected groundwater temperature in the second region 1010 can be approximately 62° F., the expected groundwater temperature in the third region can be approximately 52° F., the expected groundwater temperature in the fourth region can be approximately 42° F., and so forth.

As shown in the table 1000 in FIG. 10, the hose nozzle assembly 700 can include several nozzle settings 1002 that correspond to a setting of the nozzle sprayer 712. As described previously, the nozzle settings 1002 can relate to which apertures the water is caused to flow through when exiting the nozzle sprayer 712 and, consequently, the flow rate of the water through the heating chamber 722. Table 1000 shows several nozzle settings 1002 corresponding to the settings available on the nozzle sprayer 712 (e.g., as described previously).

Table 1000 further shows the expected flow rate 1004 corresponding to the particular nozzle setting 1002. For example, if the first "jet" pattern is selected, the expected flow rate would be approximately 0.25 gallons per minute (GPM). On the other hand, if the third "jet" pattern was selected, the expected flow rate would be approximately 1 GPM, and so forth with the other settings. Furthermore, the expected temperature rise 1006 corresponding to the selected nozzle setting 1002 is illustrated in the third column of table 1000. Continuing with the previous example, if the first "jet" setting is selected, the expected temperature rise 1006 can be about 49° F. On the other hand, if the third "jet" setting is selected, the expected temperature rise 1006 can be about 12° F., and so forth with the other settings.

As will be appreciated, the outlet temperature of the water exiting the nozzle sprayer 712 will vary depending on the inlet temperature and the temperature rise 1006. For example, if the first "jet" setting 1002 is selected, the temperature rise will be about 49° F. but the actual outlet temperature will be about 115° F. in the first region 1008 as compared to about 111° F. in the second region 1010, about 101° F. in the third region, and about 91° F. in the fourth region 1014. The expected outlet temperatures are illustrated in table 1000 corresponding to each nozzle setting 1002 and a user can select a nozzle setting 1002 based on the desired outlet temperature (or "target temperature") for the particular application. The hose nozzle assembly 700 can be further configured to limit the outlet temperature to a safe temperature such as 115° F. as indicated in the table 1000.

The temperatures and flow rates shown in FIG. 10 and described herein can be further affected by the outlet valve assembly 740 as described previously. That is, by changing a position of the outlet valve assembly 740 as described herein, the flow rate 1004 the corresponding temperature rise 1006 can be affected to cause a greater or a lesser temperature rise. As will be appreciated, the temperature and flow rates shown in table 1000 and described herein are offered for illustrative purposes and should not be construed as limiting. Furthermore, the hose nozzle assembly 700 can include more or fewer settings and correspond to various temperature settings other than those shown and described herein.

Figure 11:
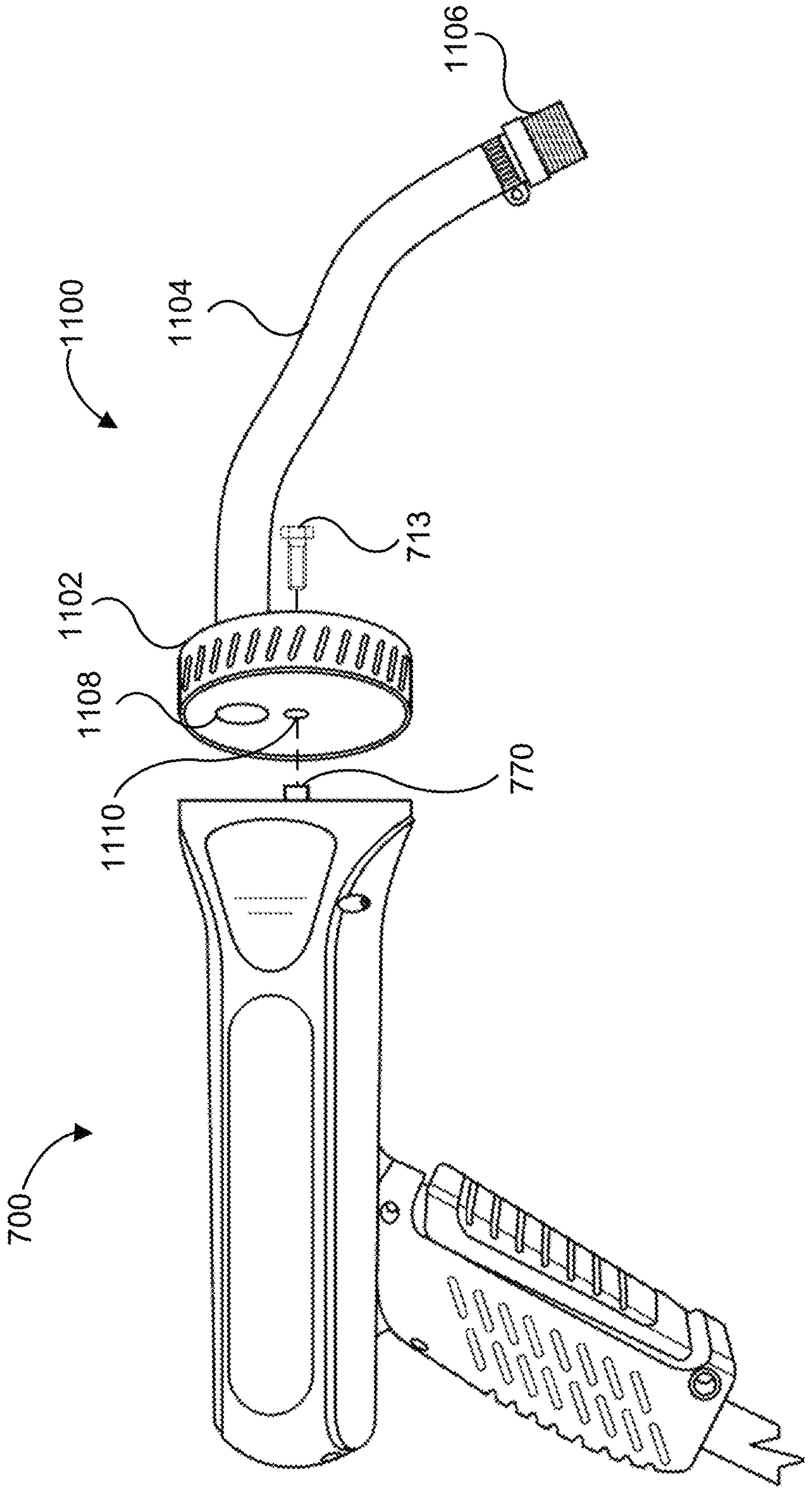
FIG. 11 illustrates an example hose attachment for a hose nozzle assembly, in accordance with the disclosed technology.

FIG. 11 illustrates a hose attachment 1100 for the hose nozzle assembly 700, in accordance with the disclosed technology. As will be appreciated, the hose nozzle assembly 700 can include each of the features shown and described herein. The hose nozzle assembly 700 can further include a hose attachment 1100 that can be configured to be attached to the outlet end of the hose nozzle assembly 700 in place of, or in addition to, the nozzle sprayer 712. For example, the hose attachment 1100 can be attached in place of the nozzle sprayer 712 by including a nozzle adapter 1102 that is attached to the hose nozzle assembly 700 via the fastener 713. The hose nozzle assembly 700 can include an alignment pin 770 and the hose attachment 1100 can include a corresponding alignment recess 1110 to help ensure the hose attachment 1100 is properly aligned with the hose nozzle assembly 700.

The hose attachment 1100 can further include a hose 1104 and a hose adapter 1106 that can be configured to be attached to another hose or to any other machine or water dispenser as desired. For example, the hose adapter 1106 can be configured to attach to a shower head, a pressure washing machine, an irrigation system, a hydronic heating system, a dish washing system, a clothes washing system, or any other suitable machine or water dispenser. Furthermore, although shown as being an adapter for a common garden hose, the hose adapter 1106 can be a quick connect fitting, a barbed fitting, a compression fitting, a crimp fitting, a flare fitting, a flange fitting, a threaded fitting, or any other suitable fitting or adapter for the application.

Accordingly, many modifications and other embodiments set forth herein will come to mind to one skilled in the art to which example hose nozzle apparatus pertain having the benefit of the teachings presented in the foregoing descriptions and the associated drawings. Therefore, it is to be understood that example hose nozzle apparatus are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A hose nozzle assembly comprising:

a handheld enclosure having a handle portion and a body portion, the handle portion connected to the body portion and adapted to be gripped by a user;

a heating chamber comprising an inlet, an outlet, and a heating element configured to heat a fluid;

a spray nozzle connected to the body portion and configured to direct a flow of the fluid from the body portion, the spray nozzle comprising:

a first aperture configured to provide a first spray pattern at a first flow rate corresponding to a first change in temperature of the fluid flowing through the heating chamber; and a second aperture configured to provide a second the first spray pattern at a second flow rate corresponding to a second change in temperature of the fluid flowing through the heating chamber, the second flow rate being less than the first flow rate, and the second change in temperature being greater than the first change in temperature.

2. The hose nozzle assembly of claim 1, wherein the first aperture is configured to facilitate heating the fluid with the heating element from a first inlet temperature to a target temperature, and wherein the second aperture is configured to facilitate heating the fluid with the heating element from a second inlet temperature to the target temperature, the second inlet temperature being less than the first inlet temperature.

3. The hose nozzle assembly of claim 1 further comprising:

a fluid inlet in fluid communication with the heating chamber and adapted for attachment to a hose;

a valve in fluid communication with the fluid inlet and configured to control the flow of the fluid; and a valve trigger configured to control the valve.

4. The hose nozzle assembly of claim 3, wherein the valve trigger is configured to activate the heating element upon actuation of the trigger.

5. The hose nozzle assembly of claim 1 further comprising an air vent in fluid communication with the heating chamber, the air vent configured to permit air to exit the heating chamber.

6. The hose nozzle assembly of claim 5, wherein the air vent is proximate the outlet of the heating chamber.

7. The hose nozzle assembly of claim 1 further comprising an outlet valve configured to adjust a flow rate of the fluid exiting the spray nozzle.

8. The hose nozzle assembly of claim 7, wherein the outlet valve is proximate the outlet of the heating chamber.

9. The hose nozzle assembly of claim 8 further comprising a flow straightener positioned between, and in fluid communication with, the outlet valve and the spray nozzle, the flow straightener being configured to reduce a turbulence of the fluid flowing through the hose nozzle assembly.

10. The hose nozzle assembly of claim 9, wherein the flow straightener is configured to cause the fluid to achieve laminar flow prior to passing through the spray nozzle.

11. The hose nozzle assembly of claim 1, wherein the heating element is a sheathed heating element.

12. The hose nozzle assembly of claim 11, wherein the heating chamber comprises a longitudinal axis extending therethrough, and wherein the sheathed heating element extends at least partially into the heating chamber, a length of the sheathed heating element being oriented parallel to the longitudinal axis of the heating chamber and a width of the sheathed heating element being oriented perpendicular to a plane extending through the heating chamber in a direction of the handle portion.

13. The hose nozzle assembly of claim 1, wherein the spray nozzle is further adapted for attachment to a hose.

14. The hose nozzle assembly of claim 1 further comprising a bimetal thermostatic switch configured to disable power to the heating element if a temperature of the fluid flowing through the hose nozzle assembly is greater than a maximum temperature.

15. The hose nozzle assembly of claim 1 further comprising:

a temperature sensor configured to detect a temperature of the fluid; and a control board housed within the handheld enclosure, in communication with the temperature sensor, and configured to control a heat output of the heating element based on data received from the temperature sensor.

16. The hose nozzle assembly of claim 15, wherein the control board is further configured to modulate power to the heating element based on temperature data received from the temperature sensor.

17. The hose nozzle assembly of claim 16, wherein the control board is configured to disable power to the heating element if a temperature of the fluid flowing through the hose nozzle assembly is greater than a maximum temperature.

18. The hose nozzle assembly of claim 15 further comprising a flow sensor configured to detect a flow of the fluid through the heating chamber.

19. A hose nozzle assembly of comprising:

a handheld enclosure having a handle portion and a body portion, the handle portion connected to the body portion and adapted to be gripped by a user;

a heating chamber comprising an inlet, an outlet, and a heating element configured to heat a fluid;

a temperature sensor configured to detect a temperature of the fluid;

a flow meter configured to detect a flow of the fluid through the heating chamber;

a control board housed within the handheld enclosure, in communication with the temperature sensor, and configured to control a heat output of the heating element based on data received from the temperature sensor, wherein the control board is further configured to modulate power to the heating element based on flow data received from the flow sensor; and a spray nozzle connected to the body portion and configured to direct a flow of the fluid from the body portion, the spray nozzle comprising:

a first aperture configured to provide a first spray pattern at a first flow rate corresponding to a first change in temperature of the fluid flowing through the heating chamber; and a second aperture configured to provide the first spray pattern at a second flow rate corresponding to a second change in temperature of the fluid flowing through the heating chamber, the second flow rate being less than the first flow rate, and the second change in temperature being greater than the first change in temperature.

20. The hose nozzle assembly of claim 15 further comprising a temperature switch configured to adjust a temperature set point, the control board being configured to control the heat output of the heating element based on the temperature set point.

* * * * *